(12) United States Patent
Yamamoto et al.

(10) Patent No.: US 6,400,254 B2
(45) Date of Patent: *Jun. 4, 2002

(54) VEHICLE ELECTRONIC KEY SYSTEM

(75) Inventors: Keiji Yamamoto, Okazaki; Kazunori Sakai; Noriaki Nakatomi, both of Aichi-ken; Sadato Kita, Toyota; Yasuo Oyama, Nagoya; Noriyuki Suzuki, Aichi-ken, all of (JP)

(73) Assignees: Toyota Jidosha Kabushiki Kaisha; Kabushiki Kaisha Tokai Rika-Denki-Sesakusho, both of Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,029

(22) Filed: Jul. 20, 1998

(30) Foreign Application Priority Data

| Jul. 23, 1997 | (JP) | ................................ 9-197608 |
| Aug. 26, 1997 | (JP) | ................................ 9-229585 |

(51) Int. Cl.7 .............................................. G05B 19/00
(52) U.S. Cl. .................. 340/5.6; 340/542; 340/825.72; 340/5.61; 340/5.64; 340/5.65; 340/5.67; 307/10.3; 307/10.5
(58) Field of Search ........................... 340/825.31, 543, 340/506, 825.72, 5.2, 542, 5.61, 5.64, 5.65, 5.67; 360/55; 307/10.3, 10.5

(56) References Cited

U.S. PATENT DOCUMENTS

| 3,820,102 A | * | 6/1974 | Schubert .................... 340/506 |
| 4,796,151 A | * | 1/1989 | Asada et al. ................ 360/55 |
| 4,965,460 A | * | 10/1990 | Tanaka et al. .............. 340/543 |
| 4,966,019 A | * | 10/1990 | Hoffmann et al. ........... 70/257 |
| 5,041,810 A | * | 8/1991 | Gotanda ..................... 340/543 |
| 5,641,999 A | * | 6/1997 | Kawashima ................ 307/10.3 |
| 5,751,073 A | | 5/1998 | Ross ........................ 307/10.5 |
| 5,808,372 A | * | 9/1998 | Schwegler et al. ........ 307/10.3 |
| 5,869,908 A | * | 2/1999 | Moczygemba et al. .... 307/10.5 |
| 5,897,598 A | | 4/1999 | Puetz ......................... 701/35 |
| 5,912,512 A | | 6/1999 | Hayashi et al. ............ 307/10.5 |
| 5,952,937 A | | 9/1999 | Koopman, Jr. et al. . 340/825.72 |

FOREIGN PATENT DOCUMENTS

| DE | 44 34 655 | 9/1994 |
| DE | 44 46 613 | 12/1994 |
| EP | 0 722 865 | 1/1995 |
| JP | 03-021575 | 1/1991 |
| JP | 8-086130 | 4/1996 |
| JP | 8-282442 | 10/1996 |
| JP | 9-71220 | 3/1997 |
| JP | 10-82224 | 3/1998 |
| WO | WO 93/23270 | 11/1993 |
| WO | WO 95/09748 | 4/1995 |
| WO | WO 97/41009 | 11/1997 |

OTHER PUBLICATIONS

U.S. application No. 09/161,425, Yamamoto et al., filed Sep. 24, 1998.

* cited by examiner

*Primary Examiner*—Brian Zimmerman
*Assistant Examiner*—Yves Dalencourt
(74) *Attorney, Agent, or Firm*—Finnegan, Henderson, Farabow, Garrett & Dunner, L.L.P.

(57) ABSTRACT

A keyhole is formed on an operating knob installed on the front surface of a rotary switch. The rotary switch can therefore be operated by inserting into the keyhole an electronic key having a long and narrow shape and then turning the operating knob. As a result, operations for an engine start using the electronic key are the same as those using a conventional key.

7 Claims, 5 Drawing Sheets

VEHICLE ELECTRONIC KEY SYSTEM

BACKGROUND OF THE INVENTION

1. Field of the Invention

This invention relates to a vehicle electronic key system for controlling permission for and the prohibition of an engine start according to a result of code matching by communication with a predetermined electronic key.

2. Description of the Related Arts

A wireless door locking system for locking and unlocking a vehicle door by a wireless portable has been suggested and the number of vehicles adopting it has increased. Moreover, some of these wireless door locking systems have additional functions. For example, a wireless portable having a function to set and reset an antitheft alarm, to open a trunk, and so on is known.

Furthermore, a handsfree smart entry system, in which an operator carries a card-type wireless portable (hereinafter referred to as an "electronic key") and a door lock is automaticaly released only at his/her approach to his/her vehicle, has been also suggested. According to such a system, an operator can always carry a card-type electronic key in, for example, his/her purse. It therefore maintains a high level of security based on communication, while it can reduce the trouble of operations necessary to release a door lock, etc.

Furthermore, for an engine start, security can also be improved by performing code matching procedures via communication. An immobilizer for achieving such a function has also been put to practical use. It is also preferable, therefore, that sending and receiving codes as an immobilizer function should be performed using an electronic key. Moreover, in an immobilizer communication takes place between a transmitter and a receiver usually installed in a key plate of an ignition key and an antenna installed on the peripheral part of a key cylinder.

When an electronic key is used, it can be used for code matching. According to Japanese Patent Laid-Open Publication No. Hei3-21575, an electronic key system in which an engine start is permitted via wireless communication with an electronic key carried by a user has been suggested.

Operations for an engine start, which have conventionally been performed by inserting an ignition key into a key cylinder, can also be performed with buttons of a card-type electronic key. Some users, however, want to perform operations for an engine start etc. by inserting a key as with a conventional ignition key, as is the same with conventional key operation etc. It is possible therefore to adopt the way of inserting a card-type electronic key, but some users want an electronic key having other shape than a card type. It also produces a problem: the shape of a place into which an electronic key is inserted must be changed.

SUMMARY OF THE INVENTION

It is an object of the present invention to provide an electronic key system which can control an engine start using electronic keys of various shapes.

According to the present invention, a vehicle electronic key system for performing code matching via communication with an electronic key and controlling permission for and the prohibition of an engine start according to a result of the matching comprises a rotary switch for an engine start and a keyhole connected to the rotary switch which the above electronic key can be inserted into, and the above electronic key inserted into the above keyhole makes the above rotary switch turnable.

As stated above, operations for an engine start are performed by inserting an electronic key into a keyhole and turning a rotary switch with this electronic key. These operations themselves are the same as those using a standard ignition key, which enables a user to operate without having a sense of incompatibility.

Furthermore, it is preferable that whether the above inserting of an electronic key into a keyhole is performed or not, the above permission for an engine start via communication is given. As a result, code matching will be performed even if an electronic key is not inserted into a keyhole. An operator therefore can directly operate a rotary switch with it in his/her hand. Even if an operator carries an electronic key not matching the shape of a keyhole, it will not hinder him/her from operations themselves. Therefore, electronic keys of various shapes can be adopted and there is no need to change the shape of a keyhole according to that of an electronic key.

Moreover, it is preferable that the above electronic key is equipped with a high-power code transmitter and a transponder the power of which is lower than that of the code transmitter and that when the above electronic key is inserted into the above keyhole, code matching is performed using the above transponder.

It enables code matching using this transponder of low power consumption if an electronic key is inserted into a keyhole. The dissipation of a battery in an electronic key can therefore be reduced. Moreover, having two code matching methods causes code matching to be surely performed even if either one becomes unavailable.

It is also preferable that a rotary switch lock unit for mechanically locking the drive of the rotary switch unit is included and that when an engine start is permitted as a result of code matching, a lock of the rotary switch by the above rotary switch lock unit is released. It can prohibit the rotary switch from turning before code matching.

Furthermore, it is preferable that a steering lock unit for mechanically locking the turn of steering is included and that when an engine start is permitted as a result of code matching, a lock of the steering by the above steering lock unit is released. It can keep the steering locked before code matching.

Moreover, it is preferable that a steering lock unit for mechanically locking the turn of the steering and a lock unit mechanically connected to the steering lock unit for mechanically locking the drive of a rotary switch unit are included and that when an engine start is permitted as a result of code matching and a steering lock is not released, the rotary switch is mechanically locked and an engine start is prohibited. This configuration would be able to surely prohibit an engine start if a steering lock is not released through some failure.

It is also preferable that the above keyhole is aligned with the turning axis of a rotary switch.

DESCRIPTION OF PREFERRED EMBODIMENT

Based on the drawings, an embodiment according to the present invention (hereinafter referred to as an "embodiment") will be described below.

Figure 1:
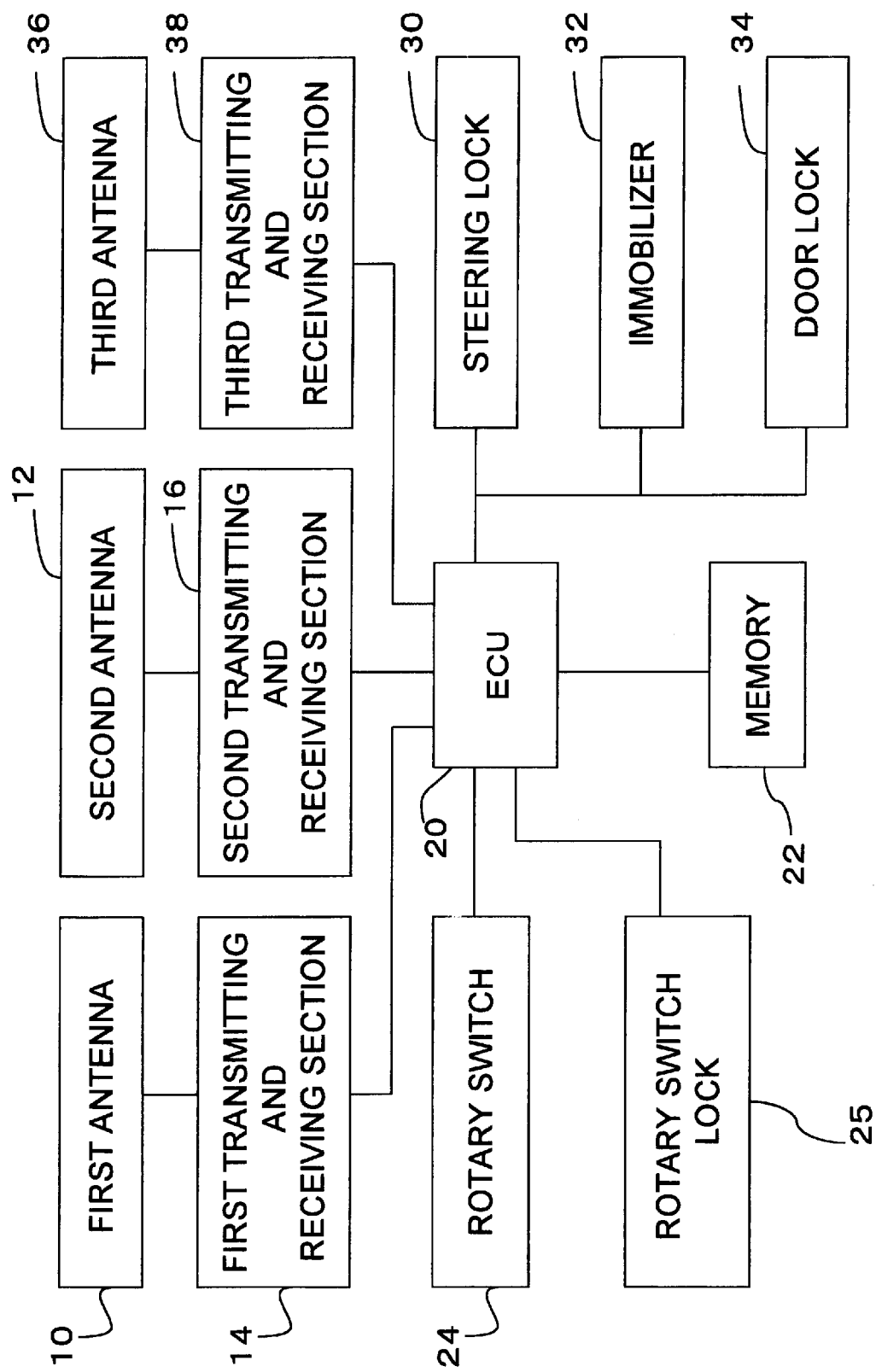
FIG. 1 is a block diagram showing a configuration of an electronic key system of an embodiment.

As shown in FIG. 1, an electronic key system in a vehicle includes three antennas: a first antenna 10, a second antenna 12, and a third antenna 36. The first antenna 10 is installed on, for example, its door handle (outer door handle); the second antenna 12, around an internal panel in front of its driver's seat; and the third antenna 36, near a keyhole to an electronic key (a rotary switch 24 functioning as an ignition switch etc.) described below. The first antenna 10, the second antenna 12, and the third antenna 36 are connected to an ECU 20 through a first transmitting and receiving section 14, a second transmitting and receiving section 16, and a third transmitting and receiving section 38 respectively. The ECU 20 communicates with an electronic key through the first antenna 10, the second antenna 12, and the third antenna 36. Actually, the first, second, and third transmitting and receiving sections 14, 16, and 38 may be integrated into one circuit.

A memory 22, which stores multiple ID codes (hereinafter simply referred to as "codes"), is connected to the ECU 20. That is, in this embodiment a code for a door lock and that for an engine start are separate. The memory 22 consists of EEPROMs etc., and so its stored contents are not erased when power is turned off.

The rotary switch 24 has the same function as that of a standard ignition switch and detects various operation performed by a user. That is, the rotary switch 24 detects operation performed by a user (operator) described below and sends the ECU 20 its corresponding operation signals. A rotary switch lock 25 for mechanically locking the rotary switch 24 is connected to it. Locking and unlocking by the rotary switch lock 25 is controlled by the ECU 20.

A steering lock 30, immobilizer 32, and door lock 34 are also connected to the ECU 20. The steering lock 30 mechanically prohibits the operation of steering; the immobilizer 32 prohibits the supply of fuel to an engine and the operation of an ignition; and the door lock 34 controls the locking and unlocking of all doors.

Figure 2:
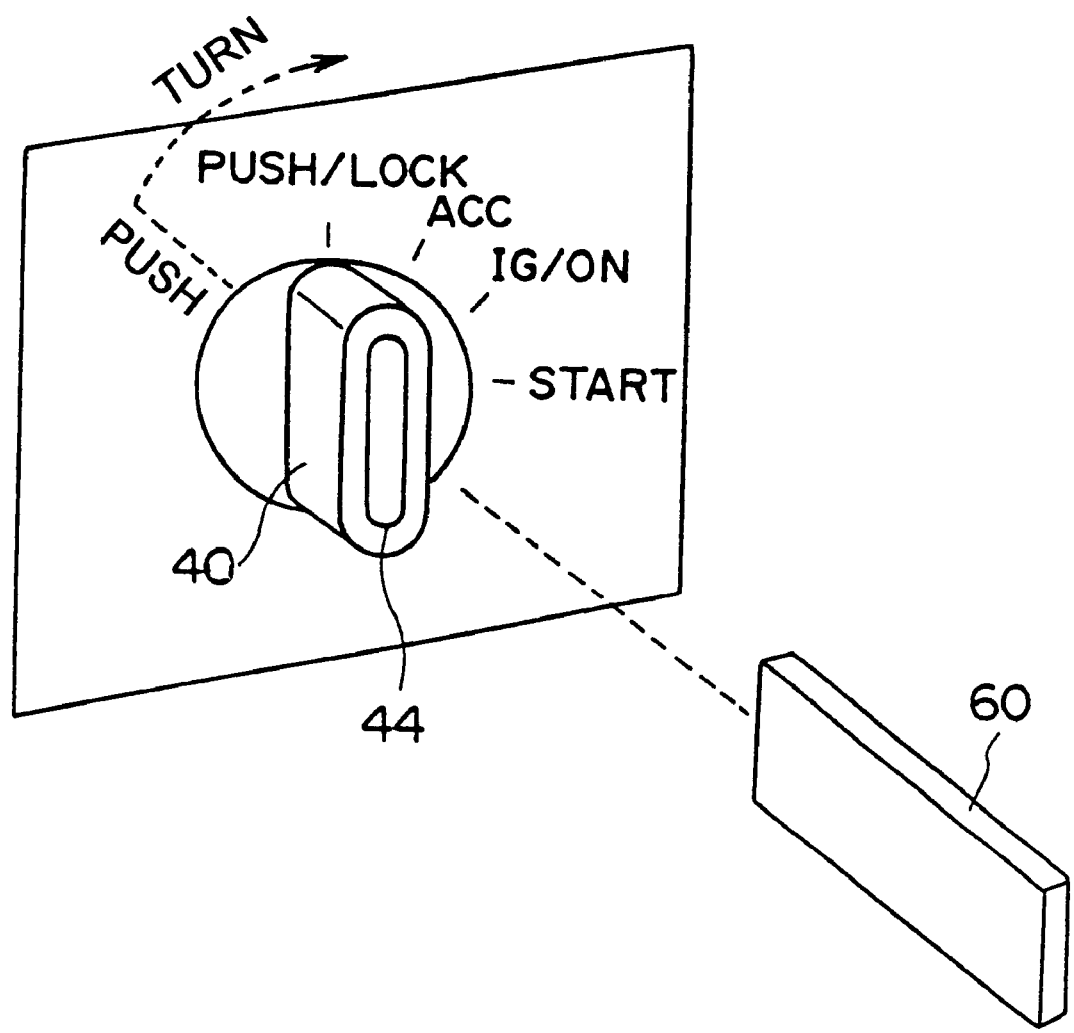
FIG. 2 is a view showing a configuration of a rotary switch.

FIG. 2 shows a rough configuration of the rotary switch 24 operated by inserting an electronic key 60. As shown in FIG. 2, an operating knob 40 is projectingly formed on the front surface of the rotary switch 24. A slit keyhole 44 is formed on the operating knob 40. The operating knob 40 is turned with the electronic key 60 having a long and narrow shape inserted into the keyhole 44. Moreover, the operating knob 40 can be turned directly with a hand. The keyhole 44 and the operating knob 40 are aligned with the turning axis of the rotary switch 24 and are mechanically connected to it. The keyhole 44 and the operating knob 40 is therefore mechanically connected to the rotary switch 24 easily, resulting in a simple configuration.

The detailed structure of the rotary switch 24 is the same as that of a rotary switch for a key cylinder with a standard mechanical key, but its description is omitted. The leftmost position of the rotary switch 24 is that for locking (PUSH/LOCK) When the operating knob 40 is pushed and then turned right, its position changes to that for turning accessories on (ACC). And when the operating knob 40 is turned right further, its position changes to that for turning an ignition on (IG/ON) and then that for turning a starter on (START).

Figure 3:
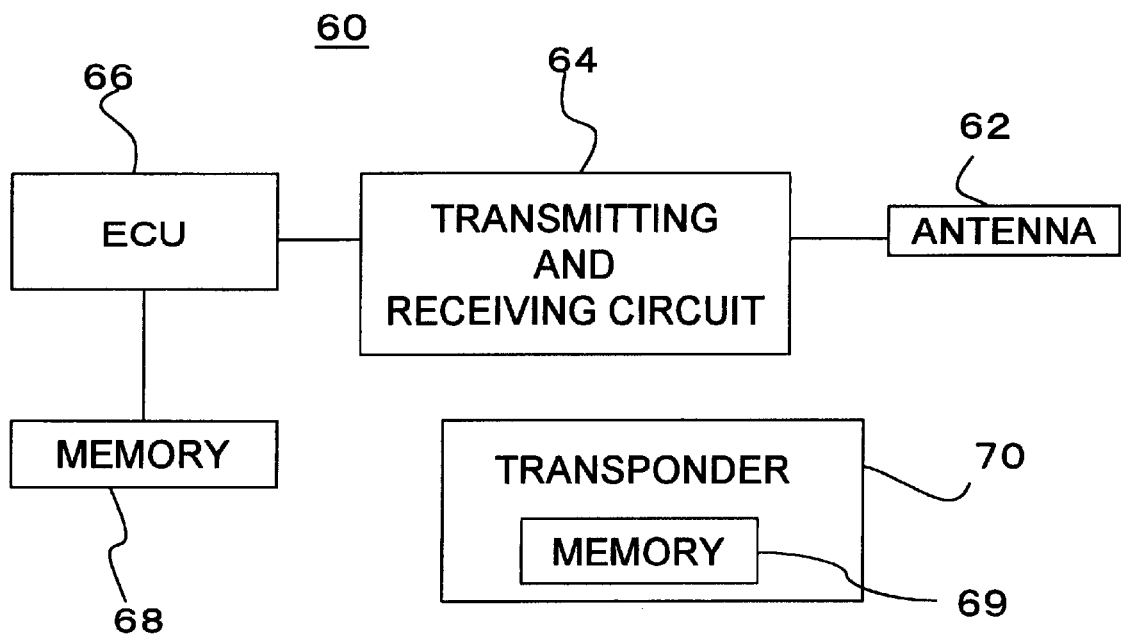
FIG. 3 is a block diagram showing a configuration of an electronic key.

FIG. 3 shows a circuit configuration of the electronic key 60. As shown in FIG. 3, an antenna 62 for wireless communication with the outside is connected to an ECU 66 through a transmitting and receiving circuit 64. A memory 68 storing codes is connected to the ECU 66. The ECU 66 reads out a code from the memory 68 in response to a signal received by the antenna 62 and outputs it from the antenna 62.

The electronic key 60 also includes a transponder 70 which also has a built-in memory 69. The transponder 70 includes an antenna, a transmitting and receiving circuit, an operation handling circuit, etc., and transmits and receives using relatively low power. That is, in response to a predetermined electronic wave received from the outside, the transponder 70 transmits a predetermined code stored in the memory 69. The memory 69 consists of EEPROMs and stores multiple codes. Furthermore, the electronic key 60 usually has a built-in battery and operates using power of this battery. On the other hand, the transponder 70 operates using electronic waves transmitted from the outside as power supply.

Figure 4:
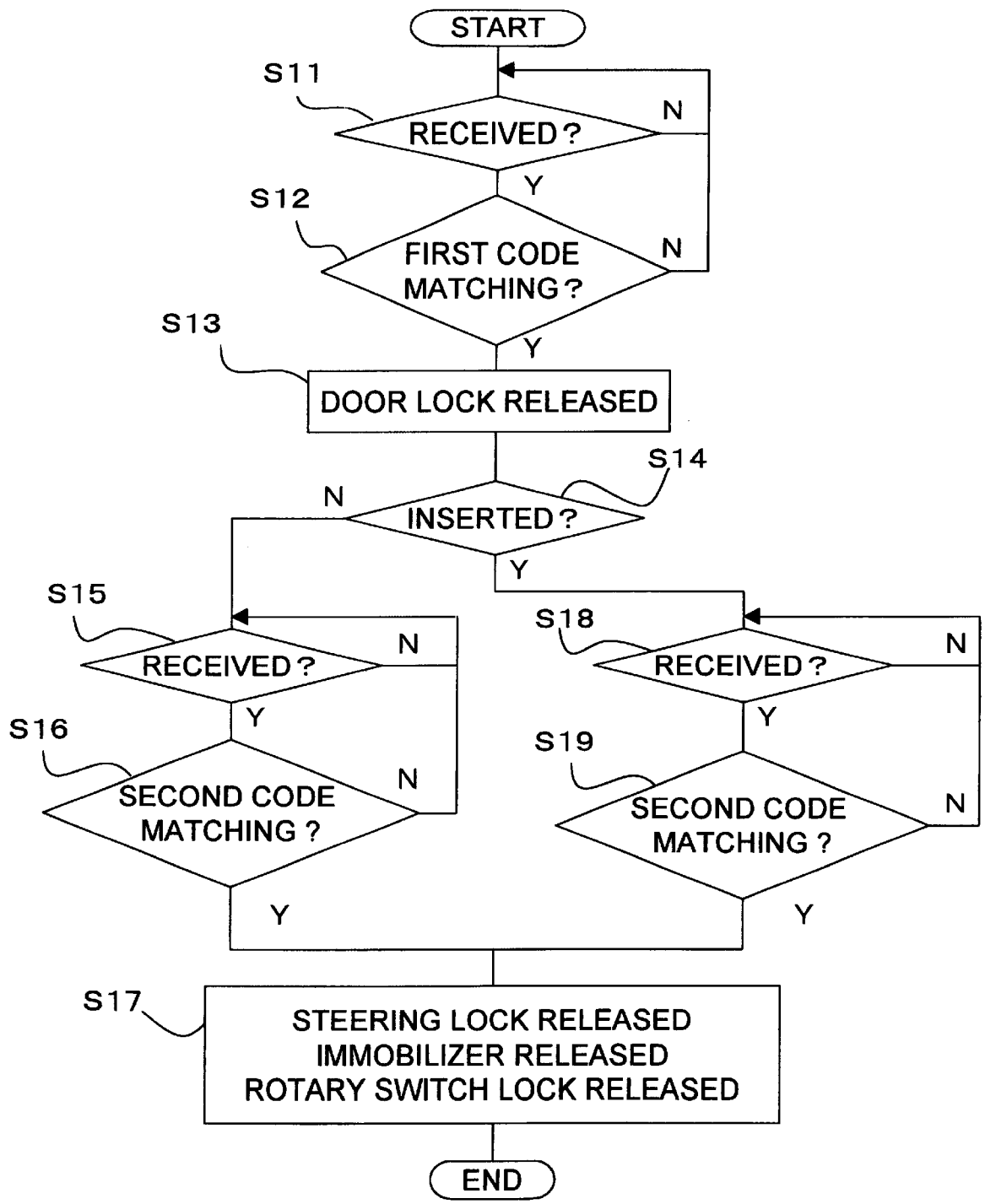
FIG. 4 is a flowchart showing the operation of the embodiment.

Next, based on a flowchart in FIG. 4, operations of this system will be described below. First, it is assumed that a vehicle is stopping with all of its doors locked. The ECU 20 transmits electronic waves on a certain frequency from the first antenna 10 regularly (for example, every 200 msec). And the ECU 20 decides whether a reply from the electronic key 60 has been received (S11).

If a user carrying the electronic key 60 approaches the vehicle, the antenna 62 of the electronic key 60 receives electronic waves from the first antenna 10 and reads out their corresponding first code from the memory 68 and transmits it. The ECU 20 in the vehicle receives from the electronic key 60 electronic waves on a predetermined wavelength; and if S11 gives YES, the ECU 20 matches a code transmitted on the received electronic waves with a first code stored in a memory 22 (S12). If a matching result in S12 is YES, the ECU 20 recognizes that the right electronic key 60 is approaching the vehicle, controls a door lock 34, and releases locks of all doors (S13).

Next, whether the electronic key 60 was inserted into the keyhole 44 is decided in the predetermined space of time (S14). If the electronic key 60 was not inserted into the keyhole 44 in S14, the ECU 20 transmits predetermined electronic waves from the second antenna 12 installed around an internal panel in front of the driver's seat and decides whether a reply from the electronic key 60 has been received (S15). The ECU 66 of the electronic key 60 reads out a second code from the memory 68 in response to electronic waves from the second antenna 12 and transmits it from the antenna 62.

If electronic waves from the electronic key 60 is received, the ECU 20 in the vehicle matches a code transmitted on these electronic waves with a second code stored in a memory 22 (S16). And if it is ascertained that the second code has been transmitted, the ECU 20 controls the steering lock 30 and the immobilizer 32, releases the steering lock 30, and releases the prohibition of an engine start by the immobilizer 32 (S17). Moreover, the ECU 20 releases a lock of the rotary switch by the rotary switch lock 25. When the rotary switch 24 is turned using the electronic key 60 to the position for turning the starter on, the engine is therefore started. Alternatively, the user may turn the rotary switch 24 with his/her hand, not with the electronic key 60.

If a decision result in S14 is YES, on the other hand, predetermined electronic waves is transmitted from the third antenna 36 installed near the keyhole 44 and a reply from the transponder 70 included in the electronic key 60 is awaited (S18). If a reply is received, whether a second code in it is right is decided (S19). If the second code is right, the process proceeds to S17. That is, the ECU 20 releases locks by the rotary switch lock 25 and the steering lock 30, releases the immobilizer 32, and permits an engine start. When the rotary switch 24 is turned using the electronic key 60 to the position for turning the starter on, the engine is therefore started.

According to the system of this embodiment, as stated above, starting operations for an engine are performed with the rotary switch 24 turned using the electronic key 60 having a long and narrow shape. These operations themselves are the same as those using a standard ignition key and, therefore, a user can perform these operations without having a sense of incompatibility. Moreover, in this embodiment, a code for a door lock is different from that for permission for an engine start, resulting in greater safety from tapping etc. Especially, there is a possibility to a certain extent that a first code communicated outside a vehicle is tapped, while there is little possibility that a second code communicated inside a vehicle is tapped. It promotes safety.

If the electronic key 60 is not inserted into the keyhole 44, the operating knob 40 can also be operated directly with a hand. And so an operator carrying the electronic key 60 which does not fit the shape of the keyhole 44 can perform operations themselves without hindrance. Therefore, various shapes can be adopted for the electronic key 60 and there is no need to change the shape of the keyhole 44 according to that of the electronic key 60.

The electronic key 60 also includes the transponder 70. If the electronic key 60 is inserted into the keyhole 44, the transponder 70 can be used to match second codes. Communication using the transponder 70 is performed within point-blank range, resulting in low power. It can reduce consumption of a battery in the electronic key 60. Furthermore, two code matching methods are provided for a second code, and so code matching can be surely performed even if one of them does not work well.

Other configurations

In the above example, a frequency on which electronic waves are transmitted from a vehicle is the same as that of electronic waves transmitted from the electronic key 60, but it is also preferable that different frequencies are used depending on the direction of electronic waves. For example, 2.45 GHz-band electronic waves of relatively great directivity should be transmitted from a vehicle, while 300 MHz-band electronic waves should be transmitted from an electronic key. In this case, transmitting and receiving antennas are separately installed. Again a significantly different frequency band, such as medium wave, may be used for communication in a vehicle. Especially, communication outside a vehicle using the first antenna 10 must be able to be performed at a distance equal to or more than 5–10 m, while communication using the second antenna 12 or the third antenna 36 must be able to be performed at a distance equal to or less than only a few meters. It is therefore preferable to set transmitting and receiving power and frequency to appropriate values.

Figure 5A:
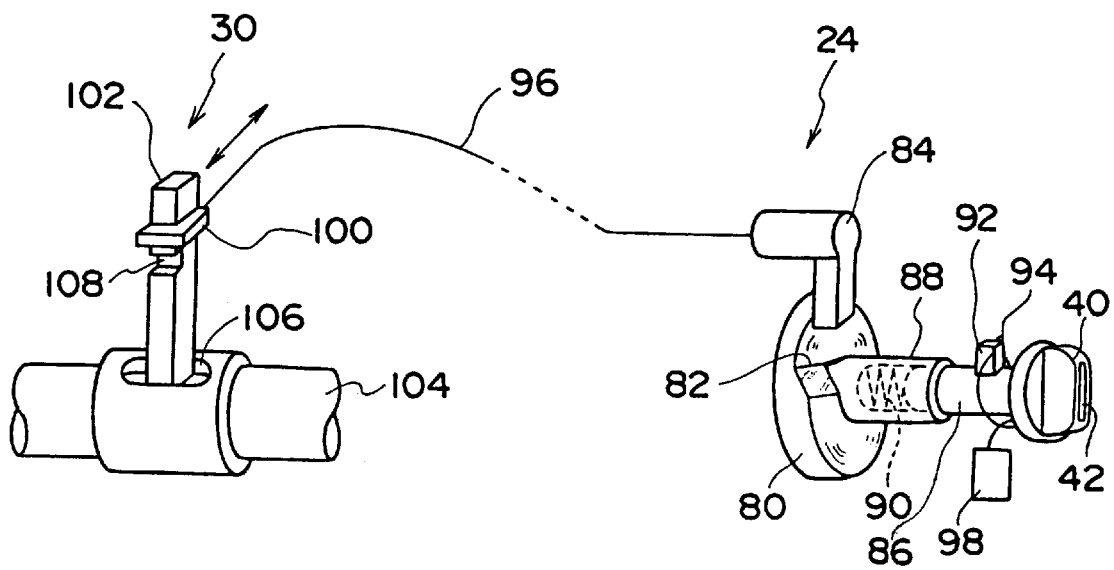
FIGS. 5(A) and 5(B) are views showing a configuration of a steering lock and rotary switch.
Figure 5B:
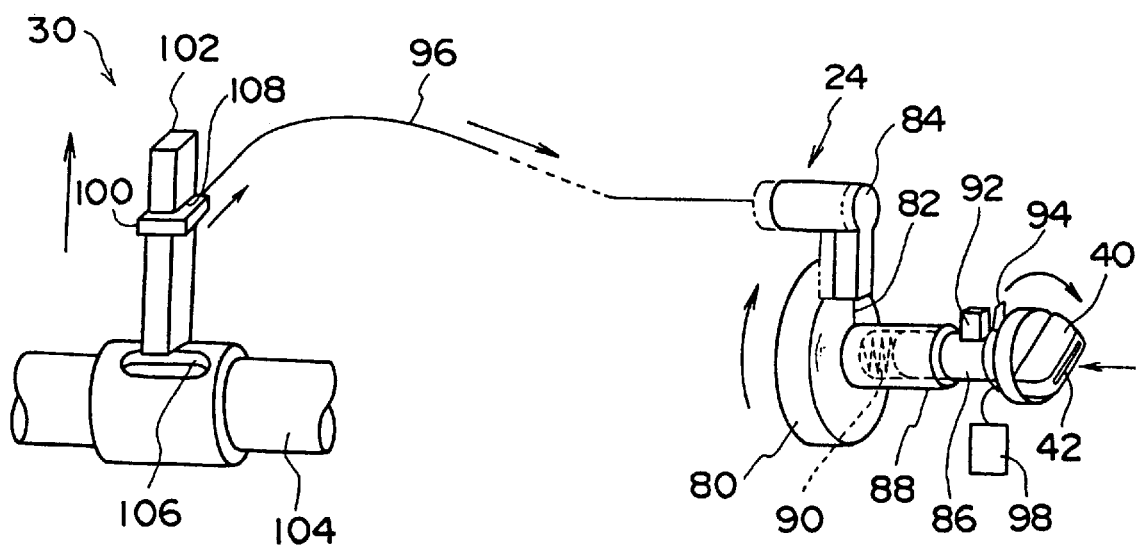

FIGS. 5(A) and 5(B) show mechanical relationships between the rotary switch 24 and the steering lock 30. That is, in this example power operations are performed by turning the rotary switch 24, but, structurally, the rotary switch 24 is mechanically prohibited from turning if a locked state of the steering lock 30 is not released.

A difference in level 82 for prohibiting the rotary switch 24 from turning is formed on a cam circular plate 80 for switches of the rotary switch 24. With respect to the difference in level 82 on the cam circular plate 80, there is a locker 84 at a position corresponding to the lock position of the rotary switch 24. The locker 84 is movable in the direction of the height of the difference in level 82 and is raised up to the level of the difference in level 82 by turning the cam circular plate 80 (in this case, clockwise). In this case, the cam circular plate 80 is not locked if the locker 84 is movable. If the locker 84 is not movable in the direction getting far from the cam circular plate 80 (in this case, counterclockwise), on the other hand, the cam circular plate 80 cannot move from the lock position, and so the rotary switch 24 is locked in the lock position.

The operating knob 40 is fixed on a shaft 86 supporting it, and the shaft 86 is held in a shaft holder 88 installed on the cam circular plate 80 with itself freely movable in the shaft direction. The cam circular plate 80 is therefore turned through the shaft 86 and the shaft holder 88 by turning the operating knob 40. Moreover, a spring 90 is placed in the shaft holder 88 and is exerting force on the shaft 86 in the direction getting far from the cam circular plate 80 (direction which causes the operating knob 40 to project from its surrounding).

A projection 92 is formed on the shaft 86. With respect to the projection 92, a stopper 94 fixed on the peripheral part is at a position corresponding to the lock position of the rotary switch 24. If the rotary switch 24 is in the lock position, the turn of the rotary switch 24 is locked by the stopper 94. When the shaft 86 is pushed in the direction of the cam circular plate 80 using the operating knob 40, the projection 92 backs away from the position of the stopper 94, and so the shaft 86 becomes movable. That is, the projection 92 can be backed from the position of the stopper 94 by pushing the operating knob 40 inward, enabling the rotary switch 24 to move between the lock position and the accessories position. A push detecting switch 98 detects that the operating knob 40 has been pushed inward.

A cable 96 for controlling this movement is connected to the above locker 84 and there is the steering lock 30 on the other end of the cable 96. That is, a lock lever 100 is connected to the other end of the cable 96. The lock lever 100 is connected to the locker 84 through the cable 96. When the locker 84 is moved, the lock lever 100 therefore moves together to its movement.

There is a lock bar 102 near the lock lever 100 and the lower end of the lock bar 102 can be fit into a slit 106 formed on a main shaft 104 of steering for locking. That is, when the lock bar 102 is in the lower position, as shown in FIG. 5(A), the lower end of the lock bar 102 is in the slit 106, resulting in locking the turn of the main shaft 104. When the lock bar 102 is in the upper position, on the other hand, the lower end of the lock bar 102 is above the slit 106, as shown in FIG. 5(B). And so the main shaft 104 can turn freely.

A lock slot 108 is formed at a predetermined position on the lock bar 102. The position of the above lock lever 100 corresponds to the lock slot 108. When the lock bar 102 is in the upper position (unlock position), the cam circular plate 80 moves the locker 84 on the turn of the operating knob 40 and the lock lever 100 connected to the locker 84 through the cable 96 enters into the lock slot 108. As a result, the lock bar 102 cannot move downward. That is, the lock lever 100 prevents a steering lock and holds the unlock position. If the lock bar 102 has not moved to the unlock position due to some failure, the lock lever 100 cannot enter into the lock slot 108. As a result, the locker 84 connected to the lock lever 100 through the cable 96 cannot move, either. And the cam circular plate 80 cannot turn and, therefore, the operating knob 40 cannot be turned from the lock position to the accessories position.

The operation of this structure will be described below. First, when the rotary switch 24 is in the lock position, the steering lock 30 keeps the lock lever 100 away from the lock bar 102. As a result, the locker 84 connected to the lock lever 100 through the cable 96 is in the lock position where the locker 84 comes into contact with the difference in level 82. And the steering is locked and cannot be turned. The projection 92 is in contact with the stopper 94, which also locks the turn of the rotary switch 24.

If the operating knob 40 is pushed in this state, it is detected by the push detecting switch 98. In response to the detection by the push detecting switch 98, the steering lock 30 causes a lock actuator (not shown) to operate to pull up the lock bar 102 and moves the lock slot 108 to a position where the lock lever 100 can fit into it. In response to a push of the operating knob 40, the projection 92 backs from the position of the stopper 94, and so the rotary switch 24 becomes turnable. When the operating knob 40 is turned in the direction of the accessories position, the cam circular plate 80 pushes up the locker 84 on a slope to a level of the difference in level 82. As a result, the lock lever 100 connected to the locker 84 through the cable 96 is moved to the lock slot 108 and the lock bar 102 is held in the unlock position. And then the rotary switch 24 reaches the positions for accessories, turning an ignition on, turning a starter on, etc. and an engine start comes possible.

If the rotary switch 24 is between the positions for accessories and for turning a starter on, the lock lever 100 is in the lock slot 108 and, therefore, steering is surely held in an unlocked state. If the rotary switch 24 is set to the lock position and a push of the operating knob 40 reverts to the original state; the lock bar 102 enters into the slit 106 placed at a lower position, the steering is locked, and the locker 84 also reaches the lock position opposite to that of the difference in level 82.

According to this embodiment, as stated above, the locker 84 and the lock lever 100 are connected via the cable 96 and their movement is mechanically determined. If the lock bar 102 does not move upward for some reason and the steering lock 30 is not released in an attempt to push and turn the operating knob 40, the turn of the rotary switch 24 is therefore blocked by the locker 84. So an engine start can surely be prevented if the steering lock 30 is not released.

While what has been described are, at present, considered to be preferred embodiments of the invention, it will be understood that various modifications may be made thereto, and it is intended that the appended claims cover all such modifications falling within the true spirit and scope of the invention.

What is claimed is:

1. A vehicle electronic key system for performing code matching via communication with an electronic key and controlling permission and prohibition of an engine start according to a result of the matching, comprising:

a manually rotatable rotary switch for an engine start;

a keyhole connected to the manually rotatable rotary switch, said electronic key being insertable therein;

wherein said electronic key inserted into said keyhole makes said manually rotatable rotary switch turnable;

and wherein said manually rotatable rotary switch includes an operating knob and is manually rotated by an operator to rotate the rotary switch without inserting the electronic key;

and wherein code matching is performed via communication with the electronic key when the electronic key is inserted into said keyhole, and the rotary switch is also turnable upon the code matching when the electronic key is not inserted into said keyhole.

2. The system according to claim 1, wherein whether said inserting of an electronic key into a keyhole is performed or not, said permission for an engine start via communication is given.

3. The system according to claim 1, wherein said electronic key includes a code transmitter having a power and a transponder having a power lower than that of the code transmitter; and when said electronic key is inserted into said keyhole, code matching is performed using said transponder.

4. The system according to claim 1, further comprising a rotary switch unit for mechanically locking the drive of the rotary switch unit, wherein, when an engine start is permitted as a result of code matching, the mechanical lock of the drive of the rotary switch by said rotary switch lock unit is released.

5. The system according to claim 1; and further comprising a steering lock unit for mechanically locking the turn of steering, wherein when an engine start is permitted as a result of code matching, a lock of the steering by said steering lock unit is released.

6. The system according to claim 1, further comprising:

a steering lock unit for mechanically locking the turn of the steering;

a rotary switch lock unit mechanically connected to the steering lock unit for mechanically locking the drive of the rotary switch unit; and wherein when an engine start is permitted as a result of code matching and a steering lock is not released, the rotary switch is mechanically locked and an engine start is prohibited.

7. The system according to claim 1, wherein said keyhole is aligned with the turning axis of the rotary switch.

* * * * *